(12) United States Patent
Bielesch (10) Patent No.: US 7,705,549 B2
(45) Date of Patent: Apr. 27, 2010

(54) SERIES RESISTOR ASSEMBLY FOR AN ELECTRIC MOTOR, CIRCUIT ARRANGEMENT COMPRISING A SERIES RESISTOR ASSEMBLY FOR OPERATING AN ELECTRIC MOTOR AND USE OF SAID ASSEMBLY

(75) Inventor: Thomas Bielesch, Mühlacker (DE)

(73) Assignee: BEHR GmbH & Co. KG, Stuttgart (DE)

( * ) Notice: Subject to any disclaimer, the term of this patent is extended or adjusted under 35 U.S.C. 154(b) by 969 days.

(21) Appl. No.: 10/559,475

(22) PCT Filed: May 19, 2004

(86) PCT No.: PCT/EP2004/005420

§ 371 (c)(1),
(2), (4) Date: Apr. 27, 2006

(87) PCT Pub. No.: WO2004/109902

PCT Pub. Date: Dec. 16, 2004

(65) Prior Publication Data

US 2006/0291821 A1    Dec. 28, 2006

(30) Foreign Application Priority Data

Jun. 5, 2003  (DE) ................. 103 25 761

(51) Int. Cl.
*H02K 7/10*   (2006.01)
*H02K 17/32*  (2006.01)
*H02K 23/68*  (2006.01)
*H02K 27/30*  (2006.01)

(52) U.S. Cl. ...................... 318/268; 318/293
(58) Field of Classification Search ........... 318/781, 318/268, 293
See application file for complete search history.

(56) References Cited

U.S. PATENT DOCUMENTS 4,163,181 A    7/1979   Farber (Continued)

FOREIGN PATENT DOCUMENTS

DE    2655574 A1    6/1978

(Continued)

OTHER PUBLICATIONS

DE4201594 (machine translation) attached pdf, pp. 1-3 dated Jul. 29, 1993.*

*Primary Examiner*—Bentsu Ro
*Assistant Examiner*—Erick Glass
(74) *Attorney, Agent, or Firm*—Foley & Lardner LLP (57) ABSTRACT

The invention relates to a series resistor assembly (1) for an electric motor (M), in particular for an electrically driven ventilating fan in a vehicle. Said assembly comprises a series resistor (2) for controlling the RPM of the electric motor (M) in one or more RPM stages (ST1, ST2, to STn) and a thermal link (6) that is optionally connected in series to the series resistor, a reversible switching element (4) for at least one of the RPM stages (ST1, ST2) being integrated into said assembly. The invention also relates to a circuit arrangement (14) comprising a reversible blocking protection and fire protection element for the electric motor (M) and/or the series resistor assembly (1), diverse status signalling lines (24a to 24c) being used to evaluate and control the ventilating fan system.

6 Claims, 5 Drawing Sheets

U.S. PATENT DOCUMENTS

| | | | |
|---|---|---|---|
| 4,567,858 A | * | 2/1986 | Hayashi .................. 123/41.13 |
| 4,752,851 A | | 6/1988 | Ritter |
| 4,806,832 A | | 2/1989 | Muller |
| 4,955,431 A | | 9/1990 | Saur et al. |
| 5,905,620 A | | 5/1999 | Becher et al. |
| 6,876,043 B1 | | 4/2005 | Sander |
| 7,161,318 B2 | | 1/2007 | Hauselt et al. |

FOREIGN PATENT DOCUMENTS

| DE | 2724269 A1 | 11/1978 |
|---|---|---|
| DE | 2838716 A1 | 3/1980 |
| DE | 3342031 A1 | 5/1984 |
| DE | 3534500 C2 | 4/1987 |
| DE | 3543207 A1 | 6/1987 |
| DE | 3716814 A1 | 12/1988 |
| DE | 37 11 392 C1 | 1/1989 |
| DE | 42 01 594 A1 | 7/1993 |
| DE | 4201594 C2 | 7/1993 |
| DE | 4406533 A1 | 12/1994 |
| DE | 19610106 A1 | 9/1997 |
| DE | 19704563 A1 | 8/1998 |
| DE | 19754981 A1 | 6/1999 |
| DE | 19904575 C1 | 3/2000 |
| DE | 10065193 A1 | 6/2002 |
| DE | 10108548 A1 | 9/2002 |

* cited by examiner

SERIES RESISTOR ASSEMBLY FOR AN ELECTRIC MOTOR, CIRCUIT ARRANGEMENT COMPRISING A SERIES RESISTOR ASSEMBLY FOR OPERATING AN ELECTRIC MOTOR AND USE OF SAID ASSEMBLY

The invention relates to a series resistor assembly for an electric motor and the use of a series resistor assembly in a circuit arrangement for operating an electric motor, in particular an electrically driven ventilating blower for a vehicle.

In vehicles, in particular internal combustion engines, electric motors, in particular electrically driven ventilating fans, are used for cooling the internal combustion engines. It is thereby possible for the heat budget of the internal combustion engine to be controlled and regulated in a targeted fashion. In this case, the ventilating blower or the ventilator is usually operated by means of a series resistor assembly in one or more speed stages. Simple ventilators for engine cooling consist in this case of so-called brush motors with upstream series resistors which are normally combined in a series resistor assembly. This series resistor assembly serves for controlling the speed of the ventilator. In the lower speed stages, the series resistor assembly is connected in series with the electric motor, whereas in the maximum speed stages the electric motor is connected directly to an onboard power supply system voltage via a conventional onboard power supply fuse.

In the case of sluggishness or blocking of the brush motor in the lower speed stages, the current loading can lead here to thermal overloading of the series resistor. Specifically for the purpose of protecting the ventilator system against a fire owing to such overloading in the lower speed stages, a thermal link, in particular a temperature-dependent microtemperature fuse, is therefore generally provided in the series resistor assembly. This thermal link is generally connected in series with the series resistor such that in the event of thermal overloading of the series resistor the thermal link responds in good time, thereby providing simple fire protection. It is disadvantageous here that the thermal link is of nonreversible design such that in the event of a fault the complete series resistor assembly must be exchanged.

Furthermore, a relatively early response of the thermal link can occur in unwanted cases such as, for example, owing to a temporary blockage of the ventilator by a foreign body. A premature response of the thermal link leads to a shutting-down of the ventilator in the lower speed stages, and can lead to overheating of the cooling system and, possibly, to the internal combustion engine being damaged when the fault is not detected in good time. In addition, premature triggering of the thermal link enables the ventilator to be operated only in the maximum speed stage. If the electric motor, for example a brush motor, is started and operated continuously in the maximum speed stage, this leads to a substantial shortening of the service life of the electric motor.

Thus, depending on the configuration of the ventilator ventilator system, the use of simple components such as, for example, fusible links, to provide protection cannot always be implemented in all specification ranges, and must often be achieved by considerable additional measures.

It is therefore the object of the invention to specify a series resistor assembly for an electric motor which effects protection of adequate quality, in particular even in lower speed stages without protection being triggered prematurely and inadvertently. Moreover, a preferred use of a series resistor assembly for an electric motor is to be specified.

The object is achieved according to the invention by means of a series resistor assembly for an electric motor, in particular for an electrically driven ventilating ventilator for a vehicle, comprising a series resistor for speed control of the electric motor in a number of speed stages, if appropriate with the aid of a thermal link connected in series with the series resistor, a reversible switching element for at least one of the speed stages being integrated.

Advantageous developments of the invention are the subject matter of the subclaims.

The invention proceeds in this case from the consideration that in the case of overloading at one of the electric motors, for example owing to sluggishness or to blocking of a ventilator driven by the electric motor, for example owing to intrusion by a foreign body, considerable thermal loading can occur, in particular excessive heating which consequently also leads to a rise in the temperature of the series resistor and of the electric motor. This, in turn, leads to the fact that an irreversible thermal link arranged in the circuit of the electric motor in a series resistor assembly responds on the basis of the raised temperature of the series resistor such that operation of the electric motor in lower speed stages is not enabled again until after exchange of the series resistor assembly. Consequently, according to the invention the series resistor assembly is provided with an additional switching element that is of reversible design. Contact is preferably established between the additional switching element and a connection of the series resistor. The switching element is preferably arranged to make thermal contact with the series resistor. Integrating a switching element in such a way directly at the series resistor, in particular at a point where the highest temperatures can occur during operation or given blocking of individual speed stages, provides the basis of a particularly simple protective circuit for reversibly switching individual or several speed stages. In addition, a conventional thermal link that is connected in series with the series resistor is provided for a multistage temperature-dependent protective circuit of the speed stage.

In order to be able to detect a temperature-induced case of a fault reliably, the switching element is expediently designed as a temperature-dependent component. The switching element is advantageously designed as a reversible thermal circuit breaker, as a semiconductor component or as a temperature-dependent resistor. In one possible embodiment, the switching element designed as reversible thermal circuit breaker can be designed as a bimetal strip. Such thermal, in particular reversible triggers sag upon heating and therefore trigger in the event of an overtemperature. Alternatively, the switching element can be designed as a semiconductor component, for example a TEMPFET, or as a temperature-dependent resistor. Further alternative electronic or mechanical components with corresponding temperature-dependent characteristics, such as, for example, PTC thermistors or else semiconductor switches, can also be used as switching elements. In other words: protection against fire and overheating that is as quick and reliable as possible is provided through triggering of the temperature-dependent switching element by virtue of the fact that the critical temperatures are detected directly by means of the switching element itself at the element—the series resistor—effecting the temperature increase.

Depending on the type and structure of the arrangement, the switching element can be designed as a break contact, make contact or changeover switch. The switching element is arranged in a fashion making thermal contact with the series resistor for the purpose of particularly reliable and easy detection of overtemperatures at the series resistor. In a preferred embodiment, the switching element is integrated in the series resistor assembly, in particular between the series resistor and the thermal link, or else next to the thermal link. The result of this is a sufficiently effective thermal contact, and thus as good as possible a transfer of heat to the relevant heat-inducing element—the series resistor—for the purpose of identifying the overtemperatures and thus the overloading of one of the speed stages at the electric motor. Moreover, such an arrangement of the switching element demands little installation space and can therefore be introduced particularly easily and without a problem into existing free spaces, and consequently be retrofitted with ease.

A first thermal switching point representing the switching element is advantageously set lower, in particular by at least 5° C. lower, than a second thermal switching point representing the thermal link. In other words: the switching element is preferably designed in such a way that triggering is performed at a temperature of greater than 50° C., and so substantially earlier than the thermal link. In order to achieve a simple and cost-effective design of the switching element, it suffices for the tolerance ranges thereof to lie in the upper, critical temperature range of the series resistor for triggering purposes.

For a particularly fast detection and monitoring of a trigger signal effecting the protection, the series resistor assembly comprises a multipole connection with at least three connection elements of which one is designed as supply connection, a further one as load connection and a further one as control contact. The use of the control contact of the multipole connection especially enables a particularly accurate and quick triggering in the event of overheating, and therefore in the case of a fault even only in a single speed stage in conjunction with a particularly easy and sufficiently effective monitoring and plausibility checking of the triggering of the switching element. The multipole connection of the series resistor assembly is expediently designed as a plug-in, welded or cable connection. For example, the multipole connection is designed as a 3-pole plug-in connection, welded connection or, by analogy therewith, in an alternative embodiment as a 3-core cable connection. An associated motor connection can therefore be made in standard fashion by a plug or by an appropriate welded or cable connection. The multipole connection can be variously embodied, depending on stipulation. For example, the multipole connection can preferably be designed as a 3-pole (or 3-core) connection. Alternatively, the connection can be embodied as a 2-pole connection (or 2-core one) with an additional contact or an additional cable, the additional contact serving for detecting overloading of the electric motor.

In a preferred embodiment of the series resistor assembly, the additional switching element is connected on one side to the series resistor, and on the other side to one of the connection elements of the series resistor assembly, in particular to the control contact. The switching element designed as a break contact is preferably connected between the positive voltage connection element, that is to say the supply connection, and the connection element of the multipole connection which forms the control contact. This permits a particularly simple and cost-effective circuit.

In order to monitor the functions of the series resistor assembly, at least one connection element, in particular the control contact, is connected to a first return line for speed control. Furthermore, a second return line for motor control can be connected to at least one connection element of the series resistor assembly, in particular to the supply connection. Again, a switchover element, for example a relay for switching over from one speed stage to another can be provided for speed-dependent control of the electric motor. The switchover element is preferably also connected thereby to one of the, or to several of the return lines. The switching element is expediently connected on the contact side, in particular by means of the control contact, to at least one switchover element, for example to a relay for stepwise speed-dependent control of the electric motor.

Moreover, according to the invention, a circuit arrangement is provided for operating an electric motor which comprises a series resistor assembly of the type described above. In order to provide it with as simple a protective circuit as possible, the electric motor is assigned a reversible switching element which is connected in parallel with the electric motor in a fashion making thermal contact therewith. The further reversible switching element is preferably integrated in the electric motor. A simple temperature-dependent protective circuit and fire protection circuit of the electric motor and of the series resistor assembly is enabled by means of the reversible switching element integrated in the electric motor and of the reversible switching element integrated in the series resistor assembly.

In addition to the temperature-dependent circuit, it is expediently possible to provide a fuse element for switching off a circuit feeding the electric motor in the event of the exceeding of a critical limiting value of, for example, 60 A. In other words: in addition to the temperature-dependent triggering of the or the switching element and/or the thermal link, and thus to a first stage of the fault correction owing to overloading of the faulty electric motor, a fuse element can be provided in a second stage for current-dependent triggering. The circuit for supplying current to the electric motor is interrupted thereby in the event of overshooting of a critical current value of, for example, greater than 60 A. An interference suppression capacitor can expediently be connected in parallel with the switching element in order to avoid electromagnetic interference as the switching element is being switched on and/or off. Other interference suppression elements can also be used depending on the requirements.

The advantages achieved with the invention consist, in particular, in that in the event, for example, of the series resistor being heated by overtemperatures, of blocking or short-circuiting of the electric motor it is even possible to detect and monitor the critical temperatures directly at the heat source by integrating a switching element making thermal contact with the series resistor and/or by integrating a switching element making thermal contact with the electric motor. It is reversibly possible for individual speed stages to be monitored separately and thus to be switched off reliably and precisely by means of a switching element assigned to the series resistor of the electric motor, for example of a ventilator or blower, and the connection of said switching element to a multipole, for example a 3-pole connection. The normal functioning of the electric motor can be reactivated after elimination of the interference by switching on the switching element.

The reversible switching element provides a particularly cost-effective solution for thermal, fire and blocking protection and enables automatic resetting after elimination of the fault. A microtemperature fuse can be dispensed with in the simplest case. Otherwise, a redundant protection can be implemented with the aid of a microtemperature fuse provided in addition to the reversible switching element.

The circuit arrangement in accordance with the invention has lower losses than conventional circuit arrangements with a number of protective elements, connected in series with the series resistor, in the form of thermal links that are omitted owing to the parallel-connected switching element. In addition, the reversible switching element has a longer service life.

Exemplary embodiments of the invention will be explained in more detail with the aid of a drawing, in which.

Mutually corresponding parts are provided in all the figures with the same reference symbols.

FIGS. 1A to 1D show various exemplary embodiments of a series resistor assembly 1 for an electric motor M. The series resistor assembly 1 comprises a series resistor 2 for controlling the speed of the electric motor in a number of speed stages ST1 to STn. A switching element 4 for reversibly switching at least one of the speed stages ST1 to STn is integrated in the series resistor assembly 1 for the purpose of protection against overheating of the series resistor 2 in the event of a fault in the electric motor M. The switching element 4 is preferably designed as a temperature-dependent component. For example, the switching element 4 is designed as a reversible thermal circuit breaker TSS, for example as a bimetal, in FIGS. 1A and 1B, and as a temperature-dependent thermistor PTC in FIGS. 1C and 1D. Alternatively, the switching element 4 can also be designed as a semiconductor element (not illustrated in more detail), for example a TEMPFET. The switching element 4 is designed as a break contact, for example. Depending on the number of the speed stages ST1 to STn of the electric motor M, the switching element 4 can also be designed as a make contact or changeover switch. As shown by way of example in FIG. 1A, an interference suppression element C, for example an interference suppression capacitor, can be connected in parallel with the switching element 4 in order to avoid electromagnetic interference when switching the switching element 4 on and/or off. Other interference suppression elements can also be used depending on the requirements.

Figure 1A:
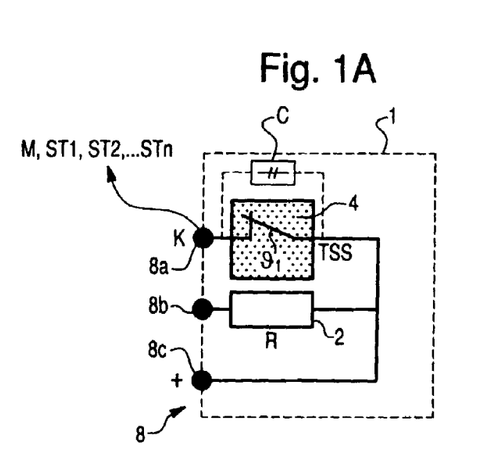
FIGS. 1A to 1D show diagrams of various exemplary embodiments of a series resistor assembly with an additional switching element.
Figure 1B:
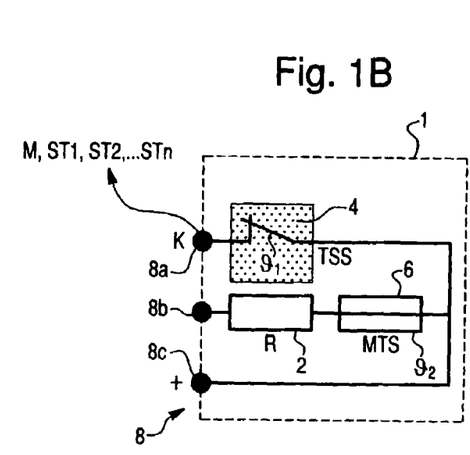
Figure 1C:
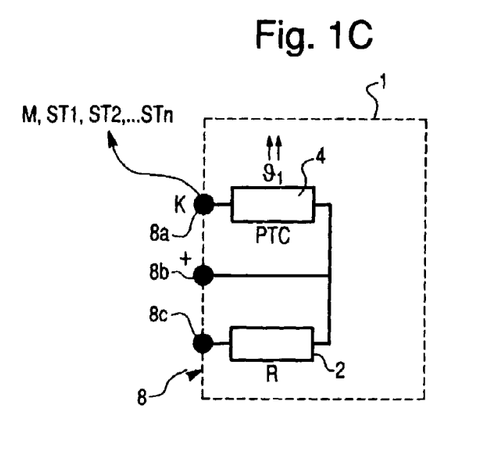
Figure 1D:
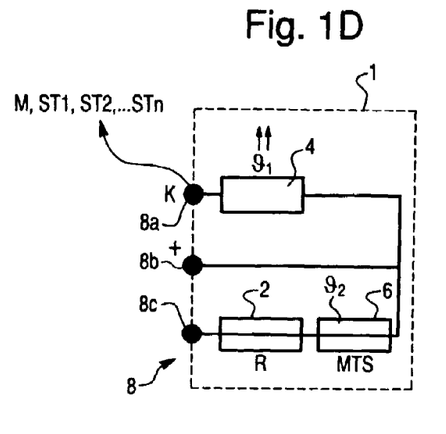

In order to switch the series resistor assembly 1 in a stepwise fashion or redundantly as a function of temperature, it can, if appropriate, as illustrated in FIGS. 1B and 1D, comprise a thermal link 6, for example a microtemperature fuse MTS, connected in series with the series resistor 2. In this case, the switching element 4 has a first thermal switching point $\theta 1$ at a critical temperature, for example at a temperature of greater than 50° C. The thermal link 6 has a second thermal switching point $\theta 2$ which is designed by contrast with the first thermal switching point $\theta 1$ of the switching element 4 to be higher, in particular higher by a temperature of greater than 5° C., and, for example, does not lead to a triggering of the irreversible thermal link 6 until at a temperature of greater than 55° C. In other words: the reversible switching element 4 triggers at a much earlier stage than does the irreversible thermal link 6. This ensures that in the event of an only slight and brief overheating after sinking of the temperature to a value below the first thermal switching point $\theta 1$, the switching element 4 switches the associated speed stage ST1 to STn again without the need to exchange the entire series resistor assembly 1. The irreversible thermal link 6 does not trigger until an exceptionally critical temperature is exceeded.

For the purpose of simple monitoring and detection of the triggering of the switching element 4 and/or of the thermal link 6, the series resistor assembly 1 comprises a multipole connection 8 with three connection elements 8a to 8c, of which one serves as control contact K, one as supply connection, and one as load or resistance connection. Depending on the type and structure of the connection 8, the latter is designed as a plug-in, welded or cable connection.

Here, the switching element 4 is connected with one end on the voltage side to the series resistor 2, which is connected to the supply connection "+". Given a thermal link 6 connected in series with the series resistor 2, the switching element 4 can also be connected with the thermal link 6 to the supply connection "+". With the other end, the switching element 4 is connected to the control contact K for controlling the speed stages ST1 to STn. The reversible switching element 4 is preferably designed such that it is switched through in normal operation, that is to say is conductive. Since the switching element 4 is connected with a contact on the voltage side to the supply connection "+", the control contact K of the switching element 4 is then also live.

FIGS. 1A to 1D show a single-stage series resistor assembly 1 for two speed stages ST1 to ST2 of the electric motor M. The number of the series resistors 2 and the type of the switching element 4 can vary depending on the construction of the electric motor M.

Figure 2:
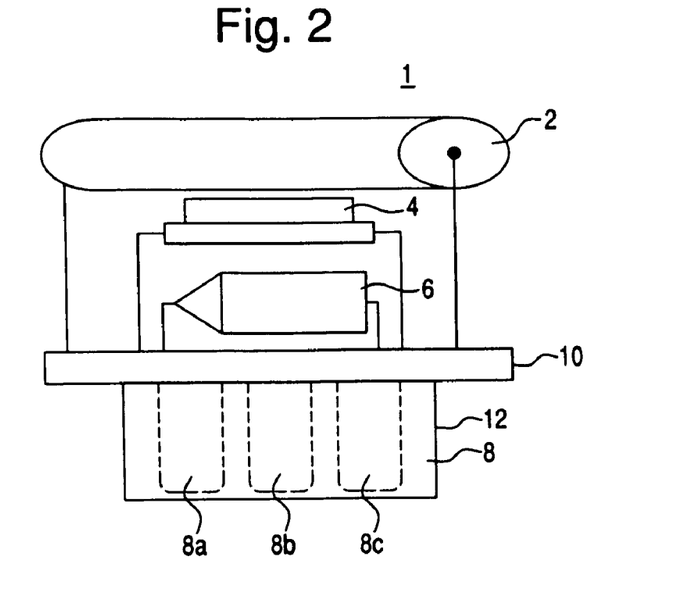
FIGS. 2, 3 show diagrams of embodiments of the design of a series resistor assembly with an additional switching element and, if appropriate, with a thermal link.
Figure 3:
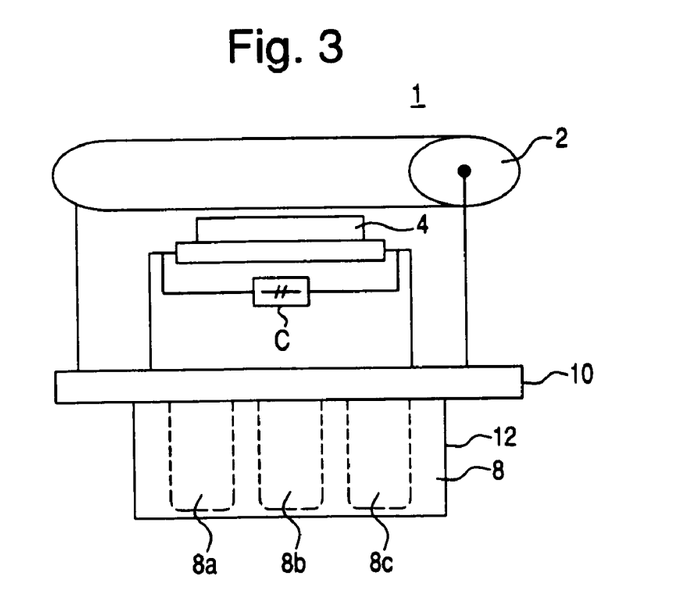

In order to enable the heating of the series resistor 2 to be detected sufficiently quickly and accurately, the switching element 4 is preferably arranged in parallel with the series resistor 2 in a fashion making thermal contact therewith, as shown in FIGS. 2 and 3. In the event of multistage temperature-dependent switching of the series resistor assembly 1 by means of the switching element 4 and of the thermal link 6, the reversible switching element 4 is arranged between or next to the series resistor 2 and the thermal link 6. That is to say, the switching element 4 is arranged in a fashion making thermal contact with the series resistor 2. The thermal link 6 is preferably arranged in the series resistor assembly 1 at a distance from the series resistor 2 with the interposition of the switching element 4. For a simple modular design of the series resistor assembly 1, the series resistor 2, the switching element 4 and, if appropriate, the thermal link 6 are arranged on a common carrier unit 10. The connection 8, in particular the connection elements 8a to 8c are surrounded by a housing 12 in order to protect against mechanical loads and thus to protect against bending. Such a series resistor assembly 1 designed as a plug-in module enables ease of mounting and dismantling. Moreover, the sandwich-type arrangement of the elements—series resistor 2, switching element 4 and, if appropriate, thermal link 6—of the series resistor assembly 1 provides a plug-in module requiring as little installation space as possible.

Figure 4:
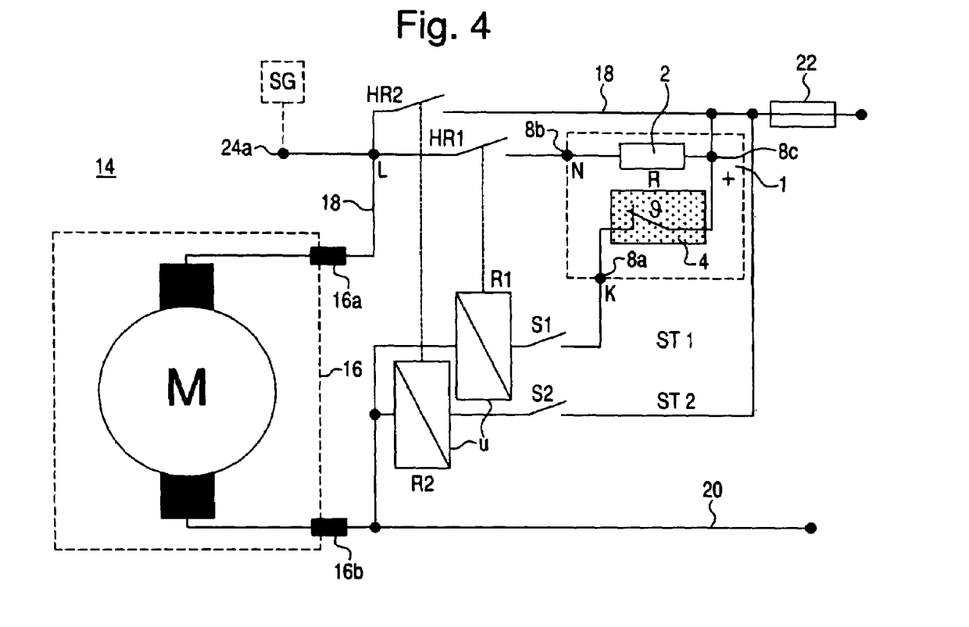
FIGS. 4 to 8 shows diagrams of various exemplary embodiments of a circuit arrangement for operating an electric motor with a series resistor assembly.

FIG. 4 shows an exemplary embodiment of a circuit arrangement 14 for operating an electric motor M, having a series resistor assembly 1 for speed-dependent control of the electric motor M in two speed stages ST1 and ST2. The electric motor M is, for example, a drive for a ventilator (not illustrated in more detail) or a blower of a vehicle (not illustrated in more detail) for the purpose of ventilating an internal combustion engine (not illustrated in more detail) of the vehicle. If a number of speed stages ST1 to STn are required for the ventilator system, the circuit arrangement 14 can comprise (in a way not illustrated in more detail) multistage series resistors 2 in one or more series resistor assemblies 1.

A multipole, for example a 2-pole motor connection 16 with two motor connection elements 16a to 16b is provided both for the purpose of supplying the electric motor M with power and of monitoring it. Depending on the type and construction of the multipole motor connection 16, the latter can be designed as a plug-in, welded or cable connection.

The two motor connection elements 16a and 16b of the 2-pole motor connection 16 serve to supply power to the electric motor M and are connected to the positive pole "+" of a battery (not illustrated in more detail) via a positive line 18, and to the negative pole "−" of the battery via a negative line 20.

The electric motor M is connected via the motor connection 16 to the speed stages ST1 and ST2 connected in parallel with one another. The speed stages ST1 and ST2 respectively comprise as a switchover element U an associated relay R1 or R2 with associated switches S1 and S2, respectively. The respective relay R1 or R2 is driven via the associated switches S1 or S2, as a result of which associated high current switches HR1 and HR2 for the respective speed stage ST1 or ST2 are respectively switched. The lower speed stage ST1 is set in this case via the series resistor assembly 1 connected upstream of the electric motor M via the relay R1 and the high current switch HR1. The maximum speed stage ST2 is implemented by activating the relay R2 and the high current switch HR2 thereof, doing so by connecting the electric motor M directly to the positive line 18. The positive line 18 is protected against short circuits in the direction of the battery via an associated fuse 22, also termed onboard power supply fuse 22.

As explained above with the aid of FIGS. 1A to 1D, depending on the type and function of the electric motor M, the series resistor assembly 1 can be of varied design. For the purpose of making electrical contact with the series resistor assembly 1 in the circuit arrangement 14, the connection 8 is provided with the connection elements 8a to 8c, which serve as control contact K, load connection N and supply connection to the positive pole "+". The series resistor assembly 1 is connected here in series with the lower speed stage ST1.

In addition, a first return line 24a (also termed monitoring line) can be arranged, at a relay contact L to the electric motor M, in parallel with the speed stages ST1 and ST2 in series with the series resistor assembly 1 directly downstream of the output of the motor connection element 16a. The return line 24a is connected by way of example to an input of a control unit SG, for example of a motor control unit or battery control unit. Here, the return line 24a is the preferred monitoring line, since by means of its arrangement it is detected whether the power supply of the electric motor M is present.

During operation of the circuit arrangement 14, one of the switches S1 or S2 for the speed stage ST1 or ST2 of the electric motor M is actuated such that the electric motor M is started. The control current for the relevant relay R1 or R2 then flows via an onboard power supply fuse 22 connected if appropriate in the positive line 18, in a circuit from the positive line 18 via the relevant relay R1 or R2 and, as a function of the speed stage ST1 or ST2, also via the series resistor assembly 1 in the case of the lower speed stage ST1 to the negative line 20.

The activation and protective function of the lower speed stage ST1 of the electric motor M is executed in this case as follows by means of the circuit arrangement 14. The control current, that is to say the switch S1 of the lower speed stage ST1 is activated, flows from the onboard power supply fuse 22 via the positive line 18 via the switching element 4 of the series resistor assembly 1, the closed switch S1, via the winding of the relay R1 to the negative line 20. The contact—the high current switch HR1—of the relay R1 is thereby closed such that the electric motor M is supplied with current via the series resistor 2 of the series resistor assembly 1.

If a rise in the current of the electric motor M now occurs, for example owing to blocking of the ventilator, in the lower ventilator stages—the lower speed stage ST1—as a result of which there can also be overloading and thus also heating of the series resistor 2 into an impermissible temperature range, the switching element 4 which is in thermal contact with the series resistor 2 is triggered. That is to say, the circuit of the lower speed stage ST1 is thereby interrupted by release of the relay R1. The electric motor M is switched off. After removal of the fault, the circuit arrangement 14 is taken into operation again without exchanging the series resistor assembly 1 by activating the speed stage ST1 in that the switching element 4 switches into its original state. The reversible switching element 4 therefore serves the purpose of directly detecting the resistor temperature. That is to say, the switching element 4 protects the series resistor 2 against overheating and fire. This can also be the case, for example, when the series resistor 2 is overloaded owing to a fault in the electric motor M. The switching element 4 acts only on the lower speed stage ST1 in the circuit arrangement 14 according to FIG. 4.

Moreover, via the return line 24a it is possible to monitor the current state of the circuit arrangement 14 continuously, for example by error management of a control unit (not illustrated in more detail). As soon as one of the speed stages ST1 or ST2 was activated, a positive voltage level is present via the positive pole "+" of the battery. If the speed stage ST1 is activated and the switching element 4 responds, the level of the return line 24a is put at negative potential. That is to say, the interruption of the circuit by the switching element 4 puts the return line 24a to negative potential. The switching element 4 is preferably provided with a switching hysteresis for tolerance ranges with various thermal switching points θ1.

Provided as current-dependent protective triggering in addition to the temperature-dependent protective triggering of the switching element 4 in the event of overloading of the series resistor 2 is the onboard power supply fuse 22 that, in particular, protects a cable harness against overheating, as well as the electric motor M against being blocked in the maximum speed stage ST2. In this case, a control current for the maximum speed stage ST2 flows from the positive pole "+" of the battery via the onboard power supply fuse 22, via the switch S2 closed for activating the speed stage ST2, and via the winding of the relay R2 to the negative pole "−" of the battery. The contact or high current switch HR2 of the relay R2 is thereby closed, and the electric motor M is supplied directly with current via the onboard power supply fuse 22. Upon triggering of the onboard power supply fuse 22, the circuit for the relay R2 is then interrupted and the high current switch HR2 is opened such that the electric motor M is switched off.

There follows a more detailed description, with the aid of the further figures, of various circuitry embodiments of a circuit arrangement 14 having various series resistor assemblies 1, various protective stages against overloading of the electric motor M and/or of the series resistor 2, and one or more return lines 22.

Figure 5:
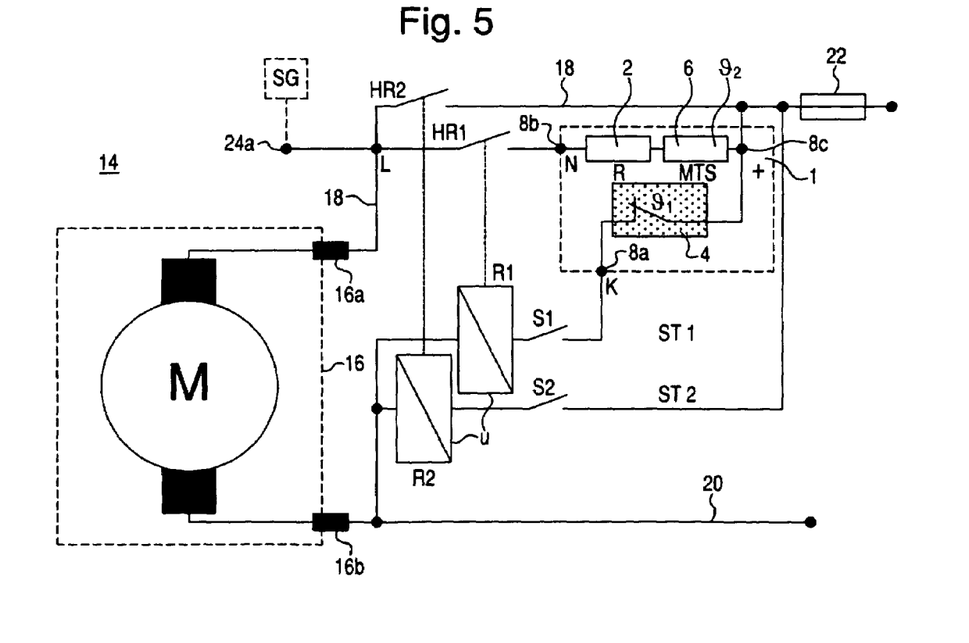

The circuit arrangement 14 in accordance with FIG. 4 is illustrated in FIG. 5 with an alternative series resistor assembly 1. In addition to the reversible switching element 4, for the purpose of the redundant or stepwise temperature-dependent protective function of the first ventilator or speed stage ST1 the series resistor assembly 1 additionally comprises a thermal link 6, in particular a microtemperature fuse MTS, connected in series with the series resistor 2.

Figure 6:
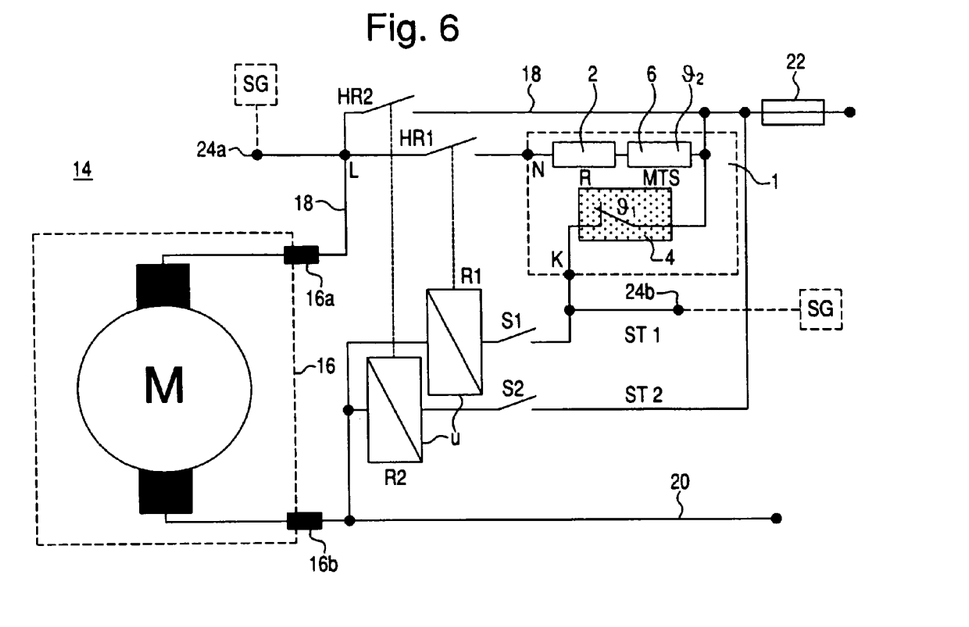

An alternative circuit arrangement 14 having a series resistor assembly 1 in accordance with FIG. 5 is illustrated in FIG. 6. By contrast with the circuit arrangement 14 according to FIG. 5, the circuit arrangement 14 according to FIG. 6 comprises a further return line 24b, which departs directly from the control contact K of the series resistor assembly 1. Here, the return line 24b indicates in the case of a positive voltage level that the switching element 4 of the series resistor assembly 1 has not triggered, and therefore that no fault is present.

If, by contrast, the return line 24b is at negative potential or is potential-free, the triggering of the switching element 4 of the series resistor assembly 1 is thereby indicated.

Depending on the type and connection of the return line(s) 24a, 24b, it is now possible, for example, for a connected motor control unit or another control unit SG to drive the electric motor M with the aid of the applied positive potential, the fault message "overloading of the electric motor M" simultaneously being output and, if appropriate, displayed through indirectly raised temperature of the series resistor 2. If appropriate after fault correction and/or corresponding cooling of the series resistor 2 by appropriate driving, the switching element 4 can be reset automatically to the original state and the circuit arrangement 14 can be set operating, this being done in a way dependent on the functionality of the relevant motor control unit.

Figure 7:
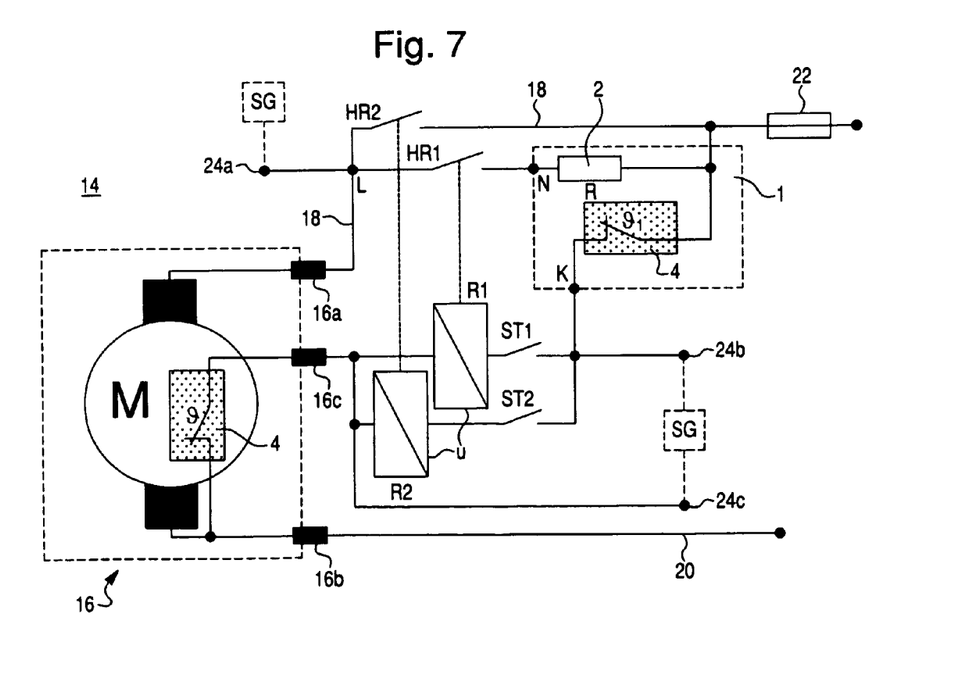
Figure 8:
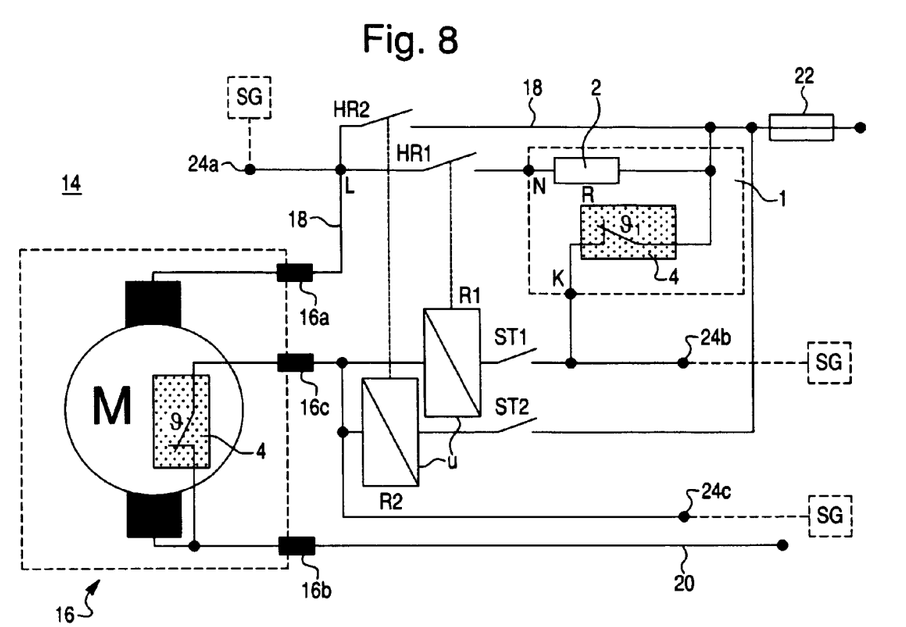

In order also to protect the ventilator and its electric motor M against an overload such as can occur, for example, upon blocking of the blower or of the ventilator, in addition to a reversible switching element 4 in the series resistor assembly an alternative circuit arrangement 14 in accordance with FIGS. 7 and 8 also comprises a reversible switching element 4 that is connected in parallel with the electric motor M. Since both reversible switching elements 4 are provided for the temperature-dependent protective circuit, these are designed in a way identical to that already described above. The switching element 4 is preferably embodied as a temperature-dependent component, for example as a reversible thermal circuit breaker in the form, by way of example, of a bimetal strip.

The switching element 4 of the electric motor M is directly integrated in the latter. That is to say, for the purpose of an arrangement of the switching element 4 that makes reliable thermal contact said switching element is fitted directly at the electric motor M, for example at a suitable point, in particular in the immediate vicinity of a location at which the largest amount of heat is produced in the event of a fault. In a preferred embodiment, the switching element 4 is arranged, for example, on the component side of a brush plate (not illustrated in more detail) of the electric motor M. Alternatively, the switching element 4 can also be fitted at another point that is reliably suitable for thermal triggering. Consequently, the reversible switching element 4 of the electric motor M detects the temperature of the latter directly, and protects the electric motor M against sluggishness, overtemperature or blocking.

In order to monitor and detect the triggering of the switching element 4 of the electric motor M, the latter has a three-pole motor connection 16 in the exemplary embodiments according to FIGS. 7 and 8, a third motor connection element 16c being connected to a contact of the switching element 4. The middle motor connection element 16c can be designed for low currents owing to the fact that it is occupied only on the circuit side.

Overtemperatures can occur in the event of a fault in the electric motor M, for example owing to blocking. Depending on the application, the critical temperature is, for example, approximately 180° C. This exceeding of the temperature at the electric motor M has the result that the internal impedance Ri of the electric motor M falls below a triggering current, for example a limiting value of 60 A, required to trigger a conventional onboard power supply fuse 22, and this in turn entails a considerable thermal load. In order to avoid such thermal loads, the switching element 4 of the electric motor M is designed, for example, in such a way that, as a result of its thermally contacting arrangement with the electric motor M, triggering occurs at a temperature of more than 50° C., as a result of which upon triggering of the switching element 4 the control circuit of the relays R1 and R2 and thus, indirectly, the power supply to the electric motor M are interrupted. In other words: the switching element 4 of the electric motor M protects the latter directly against sluggishness, blocking or overtemperature, and responds in the event of a fault before triggering of the onboard power supply fuse 22.

Since the switching element 4 of the electric motor M is connected in the common negative line 20 of the two relays R1 and R2 of the speed stages ST1 and ST2, respectively, triggering the switching element 4 of the electric motor M also works for the speed stages ST1 and ST2. The circuit arrangement 14 is reactivated after the fault correction. In this case, the reversible switching element 4 is switched into the proper state if one of the speed stages ST1 or ST2 is still being activated by the associated closed switch S1 or S2, respectively, and the electric motor M starts up again.

Moreover, in the exemplary embodiment according to FIG. 7 the positive pole "+" of the battery, that is to say the positive line 18, is connected directly, via the switching element 4 of the series resistor assembly 1, to the circuits of the speed controller in the speed stages ST1 and ST2, and therefore leads power via the switching element 4 of the series resistor assembly 1 both to the switch S1 and to the switch S2. A lead can be saved thereby, by contrast with the exemplary embodiments according to FIGS. 4 to 6 and 8. The circuit arrangement 14 is switched off upon response of the switching element 4 of the series resistor assembly 1. It is then impossible to operate the electric motor M either in the lower speed stage ST1 or in the maximum speed stage ST2.

According to FIGS. 7 and 8, the respective circuit arrangement 14 furthermore comprises a further third return line 24c. This return line 24c is led off from the middle motor connection 16c and is at the negative pole "−" of the negative line 20 via the switching element 4 of the electric motor M in normal operation. If the switching element 4 of the electric motor M responds in the event of a fault, the third return line 24c is at positive potential. This is the case in the two speed stages ST1 and ST2 according to FIG. 7 and in the lower speed stage ST1 according to FIG. 8 only when the switching element 4 of the series resistor assembly 1 has not triggered, and thus there is no overloading of the series resistor 2, but only a fault in the electric motor M. If appropriate, a fault message is output with the aid of the level of the return line 24c via a control unit SG, for example a motor control unit, connected to the return line 24c. It is likewise possible to detect the operating state of the electric motor M and of the ventilator via the appropriately wired further return lines 24a and 24b.

| List of reference symbols | |
|---|---|
| 1 | Series resistor assembly |
| 2 | Series resistor |
| 4 | Switching element |
| 6 | Thermal link |
| 8 | Multipole connection |
| 8a, 8b, 8c | Connection elements |
| 10 | Carrier unit |
| 12 | Housing |
| 14 | Circuit arrangement |
| 16 | Motor connection |
| 16a to 16c | Motor connection elements |
| 18 | Positive line |
| 20 | Negative line |
| 22 | Fuse |
| 24, 24b | Return line |
| C | Interference suppression element |
| HR1, HR2 | High current switches |
| K | Control contact |

-continued

| List of reference symbols | |
|---|---|
| L | Relay contacts to the electric motor |
| N | Electric motor |
| MTS | Microtemperature fuse |
| N | Load connection |
| R | Resistor |
| R1, R2 | Relay |
| U | Switchover element |
| SG | Control unit |
| ST1, ST2, STn | Speed stages |
| S1, S2 | Switches |
| TSS | Thermal circuit breaker |
| θ1 | First thermal switching point |
| θ2 | First thermal switching point |

The invention claimed is:

1. A series resistor assembly for an electric motor, in particular for an electrically driven ventilating ventilator in a vehicle, comprising:
a series resistor for speed control of the electric motor in one or more speed stages;
a reversible switching element integrated for at least one of the speed stages; and
a multipole connection with three connection elements of which one serves as supply connection, a further one as load connection and a further one as control contact,
wherein the switching element is connected on one side to the series resistor, and on the other side to one of the connection elements, in particular to the control contact.

2. A series resistor assembly for an electric motor, in particular for an electrically driven ventilating ventilator in a vehicle, comprising:
a series resistor for speed control of the electric motor in one or more speed stages;
a reversible switching element integrated for at least one of the speed stages; and
a multipole connection with three connection elements of which one serves as supply connection, a further one as load connection and a further one as control contact,
wherein a return line for speed control is connected to at least one connection element, in particular to the control contact.

3. A series resistor assembly for an electric motor, in particular for an electrically driven ventilating ventilator in a vehicle, comprising:
a series resistor for speed control of the electric motor in one or more speed stages;
a reversible switching element integrated for at least one of the speed stages; and
a multipole connection with three connection elements of which one serves as supply connection, a further one as load connection and a further one as control contact,
wherein a further return line for motor control is connected to at least one connection element, in particular to the load connection.

4. A series resistor assembly for an electric motor, in particular for an electrically driven ventilating ventilator in a vehicle, comprising:
a series resistor for speed control of the electric motor in one or more speed stages; and
a reversible switching element integrated for at least one of the speed stages, wherein
the electric motor is assigned a further switching element which is connected in parallel with the electric motor in a fashion making thermal contact therewith.

5. The circuit arrangement as claimed in claim 4, in which the further switching element is integrated in the electric motor.

6. The circuit arrangement as claimed in claim 4, in which the electric motor is designed with a multipole connection as plug-in or cable connection.

* * * * *